US006725809B1

United States Patent
Olgin

(10) Patent No.: US 6,725,809 B1
(45) Date of Patent: Apr. 27, 2004

(54) EDIBLE FLYING RETRIEVABLE ANIMAL TOY

(76) Inventor: Jose Olgin, 3685 Ames St., Apt. #4, Wheatridge, CO (US) 80212

( * ) Notice: Subject to any disclaimer, the term of this patent is extended or adjusted under 35 U.S.C. 154(b) by 0 days.

(21) Appl. No.: 10/374,267

(22) Filed: Feb. 26, 2003

(51) Int. Cl.$^7$ ............................................. A01K 29/00
(52) U.S. Cl. ..................................................... 119/710
(58) Field of Search ................................ 119/710, 709, 119/711, 707, 51.03; 426/104, 2; 446/46, 47, 48

(56) References Cited

U.S. PATENT DOCUMENTS

| | | | | |
|---|---|---|---|---|
| 1,009,361 A | * | 11/1911 | Weil | 119/51.03 |
| 1,791,175 A | * | 2/1931 | Tomlinson | 119/464 |
| 3,175,536 A | * | 3/1965 | Hilaire | 119/51.03 |
| 4,919,083 A | * | 4/1990 | Axelrod | 119/710 |
| 5,447,584 A | * | 9/1995 | Shakespeare et al. | 156/63 |
| 5,467,998 A | * | 11/1995 | Hellings | 273/363 |
| 5,476,069 A | | 12/1995 | Axelrod | |
| 5,553,570 A | | 9/1996 | VanNatter, III | |
| 5,673,653 A | | 10/1997 | Sherrill | |
| 5,731,020 A | * | 3/1998 | Russo | 426/104 |
| 5,934,966 A | | 8/1999 | Ward | |
| 6,360,696 B1 | * | 3/2002 | Arnold et al. | 119/710 |
| 6,591,779 B1 | * | 7/2003 | Hoogland | 119/51.03 |

* cited by examiner

Primary Examiner—Yvonne Abbott
(74) Attorney, Agent, or Firm—Sturm & Fix LLP

(57) ABSTRACT

A flying retrievable animal toy that is edible. The animal toy is formed in the shape of a retrievable disk with a circular body member having a convex upper surface and a concave lower surface. The body member is formed of an edible material such as rawhide that may be flavored with other edible materials such as beef or chicken. The toy is thrown by the animal owner to be retrieved by the animal.

4 Claims, 1 Drawing Sheet

EDIBLE FLYING RETRIEVABLE ANIMAL TOY

BACKGROUND OF THE INVENTION

1. Field of the Invention

The present invention relates to the field of animal toys, and more particularly to an edible flying animal toy.

2. Description of Related Art

As can be seen by reference to the following U.S. Pat. Nos. 5,476,069; 5,553,570; 5,673,653; and 5,934,966, the prior art is replete with myriad and diverse animal toys.

While all of the aforementioned prior art constructions are more than adequate for the basic purpose and function for which they have been specifically designed, they are uniformly deficient with respect to their failure to provide a simple, efficient, and practical edible flying retrievable animal toy.

As a consequence of the foregoing situation, there has existed a longstanding need for a new and improved animal toy, and the provision of such a construction is a stated objective of the present invention.

BRIEF SUMMARY OF THE INVENTION

Briefly stated, the present invention provides a flying retrievable animal toy that is edible. The animal toy is formed in the shape of a retrievable disk with a circular body member having a convex upper surface and a concave lower surface. The body member is formed of an edible material such as rawhide that may be flavored with other edible materials such as beef or chicken. The toy is thrown by the animal owner to be retrieved by the animal.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
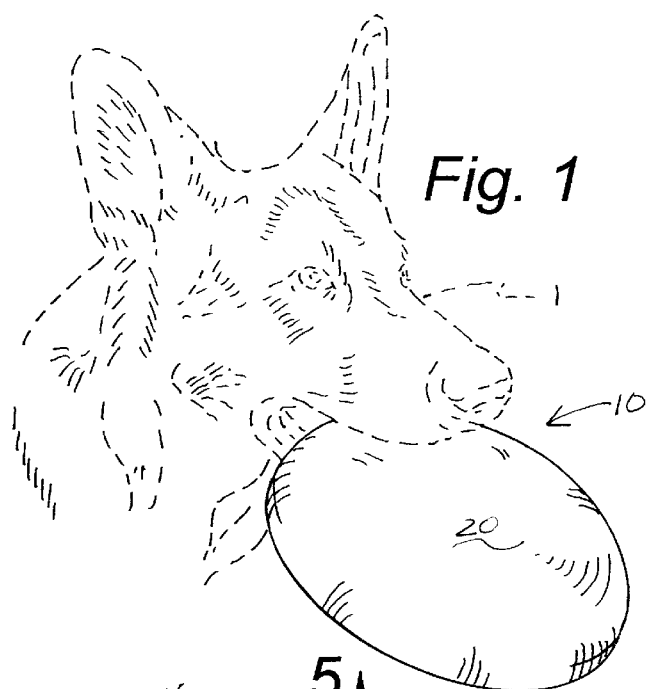
FIG. 1 is a perspective view of the animal toy of the present invention being retrieved by a dog.
Figure 5:
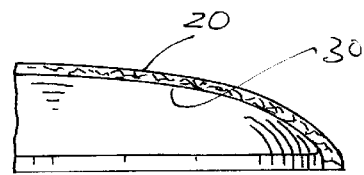
FIG. 5 is a sectional view taken along line 5—5 of FIG. 2.
Figure 2:
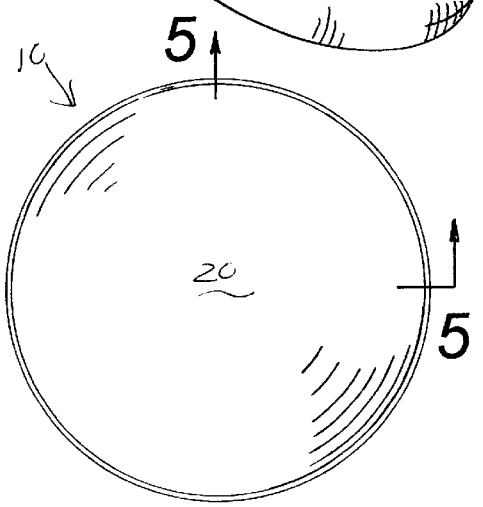
FIG. 2 is a top plan view thereof.
Figure 3:
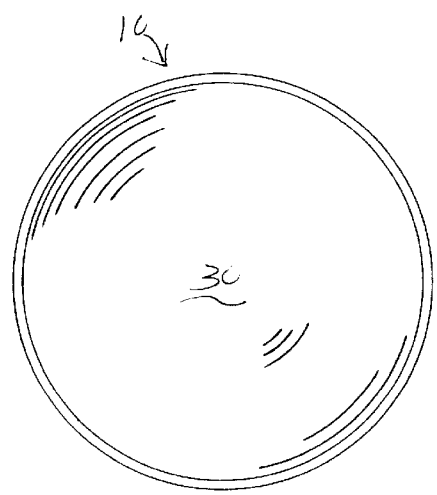
FIG. 3 is a bottom plan view thereof.
Figure 4:
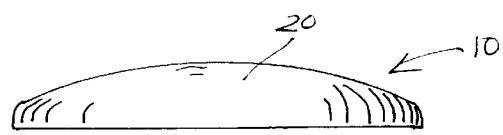
FIG. 4 is a side elevational view thereof.

As can be seen by reference to the drawings, and in particular to FIG. 1, the animal toy that forms the basis of the present invention is designated generally by the reference number 10. The toy 10 has a circular body with a convex upper surface 20 and a concave lower surface 30. This disk shape allows the toy to glide or fly when thrown. The toy 10 is made of an edible material, preferably rawhide, that can be flavored with other edible materials such as beef or chicken to further attract the animal.

In use, the toy 10 is thrown by the animal owner to be retrieved by the animal. Once the animal, such as the dog 1 shown in FIG. 1 becomes accustomed to chewing on the toy 10, they will be more inclined to chase after it when thrown. Within a short period of time, the toy 10 will become chewed up to the extent that it will no longer glide or fly when thrown. At that point, a new toy 10 is used.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. An edible flying retrievable animal toy, comprising:

a circular body member having a convex upper surface and a concave lower surface wherein the body member is formed of rawhide.

2. The animal toy of claim 1 wherein the rawhide is flavored.

3. The animal toy of claim 2 wherein the rawhide is beef flavored.

4. The animal toy of claim 2 wherein the rawhide is chicken flavored.

* * * * *